(12) United States Patent
Fu et al.

(10) Patent No.: US 11,260,688 B2
(45) Date of Patent: Mar. 1, 2022

(54) FABRIC PRINT MEDIUM

(71) Applicant: HEWLETT-PACKARD DEVELOPMENT COMPANY, L.P., Spring, TX (US)

(72) Inventors: Xulong Fu, San Diego, CA (US); Xiaoqi Zhou, San Diego, CA (US); Fredrick Muya Makau, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 103 days.

(21) Appl. No.: 16/603,001

(22) PCT Filed: Jun. 8, 2018

(86) PCT No.: PCT/US2018/036707
§ 371 (c)(1),
(2) Date: Oct. 4, 2019

(87) PCT Pub. No.: WO2019/009982
PCT Pub. Date: Jan. 10, 2019

(65) Prior Publication Data
US 2020/0230991 A1    Jul. 23, 2020

(30) Foreign Application Priority Data

Jul. 6, 2017    (WO) ................ PCT/US2017/040844

(51) Int. Cl.
*B41M 5/50*    (2006.01)
*B41J 3/407*    (2006.01)
(Continued)

(52) U.S. Cl.
CPC ............ *B41M 5/502* (2013.01); *B41J 3/4078* (2013.01); *B41M 5/0011* (2013.01);
(Continued)

(58) Field of Classification Search
CPC .. B41M 5/502; B41M 5/0041; B41M 5/5236; B41M 5/5254; B41M 5/5263;
(Continued)

(56) References Cited

U.S. PATENT DOCUMENTS

| 4,339,491 A | 7/1982 | Lauterbach et al. |
| 5,401,793 A | 3/1995 | Kobayashi et al. |

(Continued)

FOREIGN PATENT DOCUMENTS

| CN | 1461366 | 12/2003 |
| CN | 1847515 | 10/2006 |

(Continued)

OTHER PUBLICATIONS

International Search Report and Written Opinion for International Application No. PCT/US2018/036707 dated Sep. 13, 2018, 7 pages.

*Primary Examiner* — Scott A Richmond
(74) *Attorney, Agent, or Firm* — HP Inc. Patent Department

(57) ABSTRACT

A fabric printable medium comprising a fabric base substrate, with an image-side and a back-side, having a water proofing treatment including a water-repellant agent applied thereto; an adhesion promoting layer, applied to the image-side of the fabric base substrate, comprising a polymeric compound and a physical networking component; an ink-receiving coating layer over the adhesion promoting layer, comprising a first and a second crosslinked polymeric network; and a barrier layer applied to the back-side of the fabric base substrate, comprising polymeric binders and filler particles with flame retardancy properties. Also disclosed are the method for making such fabric print medium and the method for producing printed images using said material.

17 Claims, 2 Drawing Sheets

(51) Int. Cl.
| | |
|---|---|
| *B41M 5/00* | (2006.01) |
| *D06P 5/00* | (2006.01) |
| *D06P 5/30* | (2006.01) |
| *D06N 3/00* | (2006.01) |
| *D06N 3/04* | (2006.01) |
| *D06N 3/10* | (2006.01) |
| *D06N 3/18* | (2006.01) |

(52) U.S. Cl.
CPC ........ *B41M 5/0041* (2013.01); *B41M 5/0047* (2013.01); *D06N 3/0006* (2013.01); *D06N 3/0059* (2013.01); *D06N 3/042* (2013.01); *D06N 3/10* (2013.01); *D06N 3/186* (2013.01); *D06P 5/002* (2013.01); *D06P 5/30* (2013.01); *D06N 2201/02* (2013.01); *D06N 2209/128* (2013.01)

(58) Field of Classification Search
CPC .. B41M 5/5272; B41M 5/5281; B41M 5/506; B41M 5/5218; D06N 3/0059; D06N 3/186; B41J 3/4078; D06P 5/002; D06P 5/30
See application file for complete search history.

(56) References Cited

U.S. PATENT DOCUMENTS

| | | | |
|---|---|---|---|
| 5,508,072 | A | 4/1996 | Andersen et al. |
| 6,001,137 | A | 12/1999 | Aifekri et al. |
| 6,478,980 | B2 | 11/2002 | Nigam |
| 6,589,633 | B1 | 7/2003 | Ino et al. |
| 6,818,253 | B2 | 11/2004 | Kimbrell |
| 7,008,746 | B2 | 3/2006 | Williams et al. |
| 7,842,624 | B2 | 11/2010 | Hennige et al. |
| 7,871,947 | B2 | 1/2011 | Flack |
| 8,236,385 | B2 | 8/2012 | Yahiaoui et al. |
| 8,563,100 | B1 | 10/2013 | Zhou et al. |
| 8,846,161 | B2 | 9/2014 | Linford et al. |
| 9,562,319 | B2 | 2/2017 | Baker et al. |
| 2003/0116744 | A1* | 6/2003 | Kimbrell .............. D06M 15/27 252/8.62 |
| 2003/0157303 | A1 | 8/2003 | Li et al. |
| 2004/0048542 | A1 | 3/2004 | Thomaschefsky et al. |
| 2005/0233660 | A1 | 10/2005 | Kimbrell |
| 2005/0245156 | A1 | 11/2005 | Cates et al. |
| 2006/0281849 | A1 | 12/2006 | Johnson |
| 2007/0275617 | A1 | 11/2007 | Hams et al. |
| 2011/0102497 | A1 | 5/2011 | Sato et al. |
| 2011/0236611 | A1* | 9/2011 | Servante .............. C09D 133/08 428/34.1 |
| 2013/0209801 | A1 | 8/2013 | Coudyser et al. |
| 2013/0216738 | A1 | 8/2013 | Owusu et al. |
| 2013/0240021 | A1 | 9/2013 | Mu et al. |
| 2013/0280535 | A1 | 10/2013 | Maas et al. |
| 2016/0243870 | A1* | 8/2016 | Fu .................... G03G 7/0086 |

FOREIGN PATENT DOCUMENTS

| | | | |
|---|---|---|---|
| EP | 2890567 B1 * | 7/2015 | ............ B41M 5/508 |
| EP | 2890567 | 12/2016 | |
| GB | 2156394 | 10/1985 | |
| GB | 2407832 | 5/2005 | |
| JP | 2001270230 | 10/2001 | |
| JP | 2009107254 | 5/2009 | |
| KR | 20040084746 | 10/2004 | |
| WO | WO-2008076101 | 6/2008 | |
| WO | WO-2015009271 | 1/2015 | |
| WO | WO-2015142313 | 9/2015 | |
| WO | WO-2016018360 | 2/2016 | |
| WO | WO-2016200376 | 12/2016 | |
| WO | WO-2017058159 | 4/2017 | |
| WO | WO-2018048423 | 3/2018 | |
| WO | WO-2018048463 | 3/2018 | |

* cited by examiner

FABRIC PRINT MEDIUM

BACKGROUND

Inkjet printing technology has expanded its application to large format high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of medium substrates. Inkjet printing technology has found various applications on different substrates including, for examples, cellulose paper, metal, plastic, fabric and the like. The substrate plays a key role in the overall image quality and permanence of the printed images.

Textile printing has various applications including the creation of signs, banners, artwork, apparel, wall coverings, window coverings, upholstery, pillows, blankets, flags, tote bags, etc. It is a growing and evolving area and is becoming a trend in the visual communication and decoration market. As the area of textile printing continues to grow and evolve, the demand for new print mediums increases.

BRIEF DESCRIPTION OF THE DRAWINGS

The drawings illustrate various examples of the present print medium and are part of the specification.

DETAILED DESCRIPTION

Figure 1:
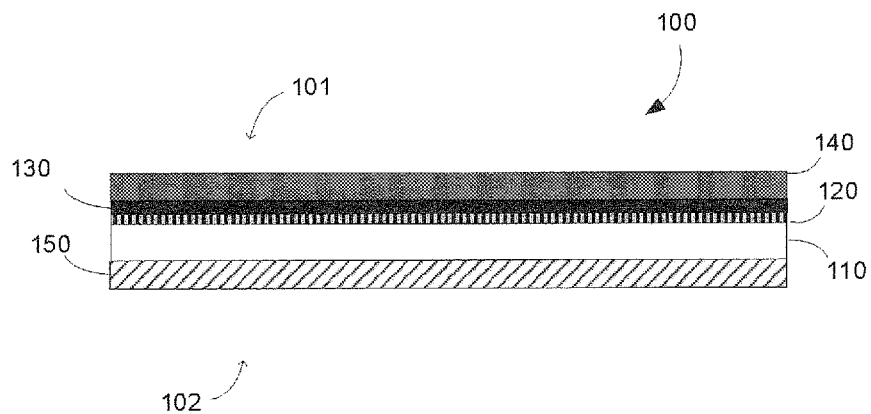
FIGS. 1 and 2 are cross-sectional views of the fabric print medium according to examples of the present disclosure.

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percentages are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

When printing on fabric substrates, challenges exist due to the specific nature of fabric. Indeed, often, fabric does not accurately receive inks. Some fabrics, for instance, can be highly absorptive, diminishing color characteristics, while some synthetic fabrics can be crystalline, decreasing aqueous ink absorption leading to ink bleed. These characteristics result in the image quality on fabric being relatively low. Additionally, black optical density, color gamut, and sharpness of the printed images are often poor compared to images printed on cellulose paper or other media types.

Some fabric has very rough surface, and it requires to have very high amount of adhesive to have good bond to the wall surface. All these characteristics resulting in the image quality on fabric being relatively compromised. Yet another problem associated with printing on fabric is related to a reduction in image durability where printed ink in general had poor interaction with rough and sometimes open fabric surface. Customers often prefer softer fabric properties while maintaining colorant adherence and image quality. Further, when fabric is intended to be a wallcovering, there are also concerns about the increase of the flammability of the fabric, thus, fire retardant characteristics is often required when providing printable fabrics. As wallcovering fabric, it is also very desirable to have back adhesive coating pre-applied. Obtaining good print characteristics while retaining fabric texture, easy installation and fire-retardant characteristics can be challenging, and providing one or more of these features can provide an advancement in the art of printable wallcovering fabric.

The present disclosure is drawn to a fabric printable medium. The fabric printable medium comprises a fabric base substrate, with an image-side and a back-side, having a water proofing treatment including a water-repellant agent applied thereto; an adhesion promoting layer, applied to the image-side of the fabric base substrate, comprising a polymeric compound and a physical networking component; an ink-receiving coating layer, applied over the adhesion promoting layer, comprising a first and a second crosslinked polymeric network; and a barrier layer applied to the back-side of the fabric base substrate, comprising polymeric binders and filler particles with flame retardancy properties. The present disclosure also relates to a method for forming said fabric print medium and to the printing method using said fabric print medium.

The image printed on the fabric printable medium of the present disclosure exhibits excellent printing qualities, durability and softness. By using coating compositions (also called layers), in combination with fabric base substrate, the printing process is more accurate, and the printed image is more permanent. The resultant printed fabric will also be able to provide fire/flame resistance or inhibition to the fabric. The present disclosure refers to a fabric print medium comprising a fabric base substrate and coating compositions applied to said fabric base substrate. The coating compositions, also called treatment compositions, once applied on the fabric base substrate, form thin layers onto the fabric base surface.

Figure 2:
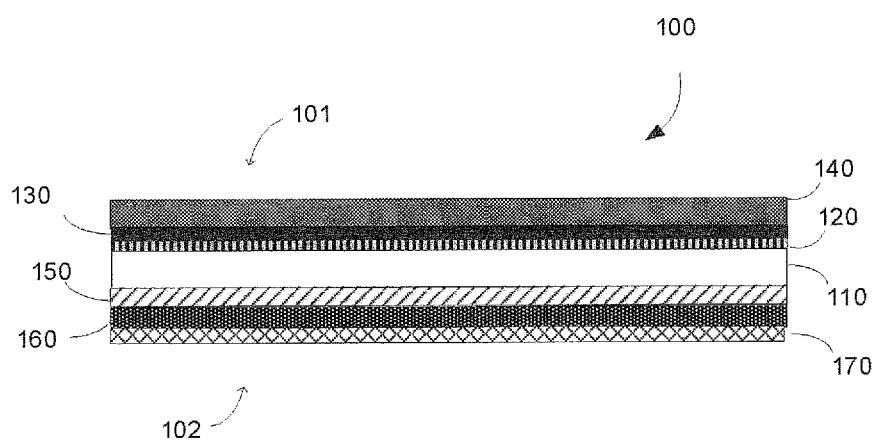
Figure 3:
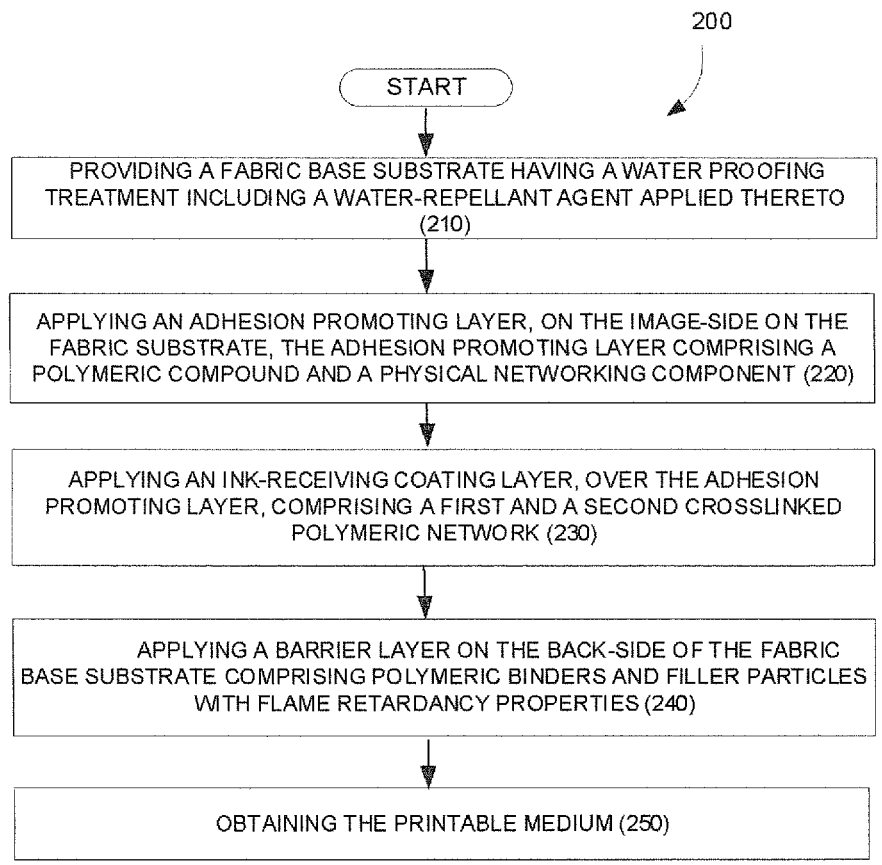
FIG. 3 is a flowchart illustrating a method for producing the fabric print medium according to some examples of the present disclosure.
Figure 4:
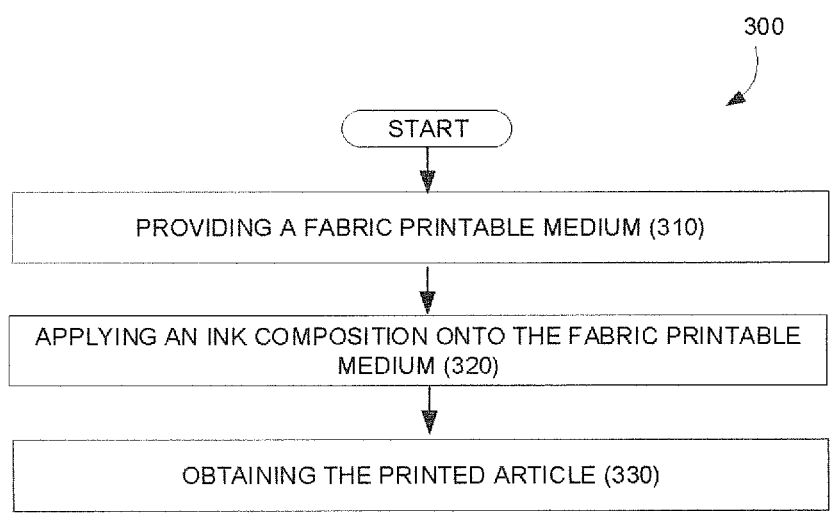
FIG. 4 is a flowchart illustrating a method for producing printed images according to some examples of the present disclosure.

FIG. 1 and FIG. 2 schematically illustrate some examples of the fabric printable medium (100) as described herein. FIG. 3 is a flowchart illustrating an example of a method for producing the fabric printable medium. FIG. 4 is a flowchart illustrating an example of printing method comprising obtaining a fabric printable medium as described therein and applying an ink composition onto said fabric printable medium to form a printed image.

As will be appreciated by those skilled in the art, FIG. 1 and FIG. 2 illustrate the relative positioning of the various layers of the printable media without necessarily illustrating the relative thicknesses of the various layers. It is to be understood that the thickness of the various layers is exaggerated for illustrative purposes.

As illustrated in FIGS. 1 and 2, the fabric printable medium (100) encompasses a fabric base substrate (110), also called supporting base substrate or bottom substrate (110), that has a water proofing treatment (120). The fabric printable medium (100) encompasses also several coating layers: an adhesion promoting layer (130), an ink-receiving coating layer (140) and a barrier layer (150).

The fabric base substrate (and, thus, the fabric printable medium) has two surfaces: a first surface which might be referred to as the "image receiving side", "image surface" or "image-side" (101), and a second surface, the opposite surface, which might be referred to as the "back surface" or "back-side" (102). The image-side is considered as the side where the image will be printed (i.e. received).

In some examples, such as illustrated in FIG. 1, the fabric printable medium (100) encompasses a fabric base substrate (110) having a water proofing treatment (120), an adhesion promoting layer (130) that is applied on the image-side (101) of the fabric base (110) and an ink-receiving coating layer (140) that is applied over the adhesion promoting layer (130). The fabric printable medium (100) further contains, on its back-side (102), a barrier layer (150)

In some other examples, such as illustrated in FIG. 2, the fabric printable medium (100) further comprises a pressure sensitive adhesive coating layer (160) that is applied directly over the barrier layer (150) on the back-side (102) of the media and a release layer (170) that is applied directly over the pressure sensitive adhesive coating layer (160).

An example of a method (200) for forming a fabric printable medium in accordance with the principles described herein, by way of illustration and not limitation, is shown in FIG. 3. Such method encompasses providing (210) a fabric base substrate with an image-side and a back-side; applying (220) an adhesion promoting layer, on the image-side on the fabric base substrate, the adhesion promoting layer comprising a polymeric compound and a physical networking component; applying (230) an ink-receiving coating layer over the adhesion promoting layer, comprising a first and a second crosslinked polymeric network; and applying (240) a barrier layer on the back-side of the fabric base substrate, comprising polymeric binders and filler particles with flame retardancy properties (240) in order to obtain (250) the fabric printable medium.

An example of a printing method in accordance with the principles described herein, by way of illustration and not limitation, is shown in FIG. 4. FIG. 4 illustrates examples of the printing method (300) that encompasses: providing a fabric printable medium (310) as described herein, applying an ink composition onto said a printable medium (320) and obtaining a printed article (330).

The Fabric Base Substrate (110)

A fabric print medium (100) of the present disclosure, which can also be called herein printable recording media, is a fabric media that comprises a fabric base substrate (110) or fabric substrate. The fabric base substrate (110) can also be called bottom supporting substrate or fabric supporting substrate. The word "supporting" also refers to a physical objective of the substrate that is to carry the coatings layer and the image that is going to be printed.

Regarding such fabric base substrate, any textile, fabric material, fabric clothing, or other fabric product where there is a desire for application of printed matter can benefit from the principles described herein. More specifically, fabric base substrates useful in present disclosure include substrates that have fibers that may be natural and/or synthetic. The term "fabric" as used to mean a textile, a cloth, a fabric material, fabric clothing, or another fabric product. The term "fabric structure" is intended to mean a structure having warp and weft that is one of woven, non-woven, knitted, tufted, crocheted, knotted, and pressured, for example. The terms "warp" and "weft" refers to weaving terms that have their ordinary means in the textile arts, as used herein, e.g., warp refers to lengthwise or longitudinal yarns on a loom, while weft refers to crosswise or transverse yarns on a loom.

Additionally, fabric base substrate useful in the present disclosure can include fabric base substrates that have fibers that can be natural and/or synthetic. It is notable that the term "fabric substrate" does not include materials commonly known as any kind of paper (even though paper can include multiple types of natural and synthetic fibers or mixture of both types of fibers). The paper thereon is defined as the felted sheet, roll and other physical forms that are made of various plant fibers (like trees or mixture of plant fibers) with synthetic fibers by laid down on a fine screen from a water suspension. Furthermore, fabric substrates include both textiles in its filament form, in the form of fabric material, or even in the form of fabric that has been crafted into finished article (clothing, blankets, tablecloths, napkins, bedding material, curtains, carpet, shoes, etc.). In some examples, the fabric base substrate has a woven, knitted, non-woven or tufted fabric structure.

In some examples, the fabric base substrate comprises wool, cotton, silk, linen, jute, flax, hemp, rayon, corn starch, tapioca, sugarcane, polyvinyl chloride, polyester, polyamide, polyimide, polyacrylic, polyacrylic polypropylene, polyethylene, polyurethane, polystyrene, polyaramid, polytetrafluoroethylene, polyethylene terephthalate, fiberglass, polytrimethylene, polycarbonate, polyester terephthalate, polybutylene terephthalate, or a combination thereof. In some other examples, the fabric base substrate is woven, knitted, non-woven or tufted and comprises natural or synthetic fibers selected from the group consisting of wool, cotton, silk, rayon, thermoplastic aliphatic polymers, polyesters, polyamides, polyimides, polypropylene, polyethylene, polystyrene, polytetrafluoroethylene, fiberglass, polycarbonates polytrimethylene terephthalate, polyethylene terephthalate and polybutylene terephthalate. In yet some other examples, the fabric base substrate is a synthetic polyester fiber.

In some examples, the fabric base substrate (110) has a basis weight that is ranging from about 50 grams per square meter (g/m2 or gsm) to about 400 grams per square meter (g/m2 or gsm). In some other examples, the basis weight of the fabric base substrate can range from about 100 gsm to about 300 gsm.

The fabric base substrate can be a woven fabric where warp yarns and weft yarns are mutually positioned at an angle of about 90°. This woven fabric includes, but is not limited to, fabric with a plain weave structure, fabric with twill weave structure where the twill weave produces diagonal lines on a face of the fabric, or a satin weave. The fabric base substrate can be a knitted fabric with a loop structure including one or both of warp-knit fabric and weft-knit fabric. The weft-knit fabric refers to loops of one row of fabric are formed from the same yarn. The warp-knit fabric refers to every loop in the fabric structure that is formed from a separate yarn mainly introduced in a longitudinal fabric direction. The fabric base substrate can also be a non-woven product, for example a flexible fabric that includes a plurality of fibers or filaments that are one or both of bonded together and interlocked together by a chemical treatment process (e.g., a solvent treatment), a mechanical treatment process (e.g., embossing), a thermal treatment process, or a combination of two or more of these processes.

The fabric base substrate can include one or both of natural fibers and synthetic fibers. Natural fibers that may be used include, but are not limited to, wool, cotton, silk, linen, jute, flax or hemp. Additional fibers that may be used include, but are not limited to, rayon fibers, or those of thermoplastic aliphatic polymeric fibers derived from renewable resources, including, but not limited to, cornstarch, tapioca products, or sugarcanes. These additional fibers can be referred to as "natural" fibers. In some examples, the fibers used in the fabric base substrate includes a combination of two or more from the above-listed natural fibers, a combination of any of the above-listed natural fibers with another natural fiber or with synthetic fiber, a mixture of two or more from the above-listed natural fibers, or a mixture of any thereof with another natural fiber or with synthetic fiber.

The synthetic fiber that may be used in the fabric base substrate can be a polymeric fiber including, but not limited to, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company), fiberglass, polytrimethylene, polycarbonate, polyethylene terephthalate or polybutylene terephthalate. In some examples, the fibers include a combination of two or more of the above-listed polymeric fibers, a combination of any of the above-listed polymeric fibers with another polymeric fiber or with natural fiber, a mixture of two or more of the above-listed polymeric fibers, or a mixture of any of the above-listed polymeric fibers with another polymer fiber or with natural fiber. In some examples, the synthetic fiber includes modified fibers from above-listed polymers. The term "modified fibers" refers to one or both of the polymeric fiber and the fabric as a whole having underwent a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, for example acid etching, and a biological treatment, for example an enzyme treatment or antimicrobial treatment to prevent biological degradation. The term "PVC-free" means no polyvinyl chloride (PVC) polymer or vinyl chloride monomer units in the substrate.

The fabric base substrate can include both natural fibers and synthetic fibers. In some examples, the amount of synthetic fibers represents from about 20 wt % to about 90 wt % of the total amount of fibers. In some other examples, the amount of natural fibers represents from about 10 wt % to about 80 wt % of the total amount of fibers. In some other examples, the fabric liner includes natural fibers and synthetic fibers in a woven structure, the amount of natural fibers is about 10 wt % of a total fiber amount and the amount of synthetic fibers is about 90 wt % of the total fiber amount. In some examples, the fabric liner can also include additives such as, but not limited to, one or more of colorant (e.g., pigments, dyes, tints), antistatic agents, brightening agents, nucleating agents, antioxidants, UV stabilizers, fillers, lubricants, and combinations thereof.

Water Proofing Treatment (120)

The fabric base substrate (110) is treated with a water proofing treatment (120) to form a treated fabric base substrate. Without being bounded by any theory, it is believed that the water proofing treatment can help prevent the adhesion promoting layer, the ink-receiving layer and/or the barrier layer from penetrating through the open holes in the fabric base substrate and subsequently contaminating the image and/or the backside of the fabric base substrate. Backside contaminants can transfer onto the front side of a rolled substrate and can destroy the coating quality of rolled fabric base substrates. It is also believed that the waterproofing treatment can prevent the "de-watering" effect that could happen during manufacture. De-watering can be due to the "open structure" of a fabric substrate that can allow for coating compositions to be lost by penetrating through the fabric base substrate when a coating composition is applied. In some examples, the fabric yarn is coated with the water proofing treatment in order to become hydrophobic.

The water proofing treatment is accomplished using a solution containing water-repellant agent. In some examples, the water-repellent agent comprises a fluorocarbon polymer, polyacrylate with perfluoro side chain, a polyvinylidene chloride emulsion, a polyolefin emulsion, a poly(ethyl-terephthalate) emulsion, an aqueous wax dispersion, a perfluorooctane sulfonate, a perfluorooctanoic acid, a paraffin wax, paraffin wax plus aluminum salt, paraffin wax plus chromium salt, a fatty acid, a hydrogen siloxane emulsion, or a combination thereof.

The water-repellant agent can include a fluorocarbon polymer, e.g., having a C1 to C6 fluorinated saturated chain grafted on a polymeric acrylic backbone. Other water-repellant agents can include a polyvinylidene chloride emulsion, a polyolefin emulsion, a poly(ethyl-terephthalate) emulsion, an aqueous wax dispersion, a perfluorooctane sulfonate, a perfluorooctanoic acid, a paraffin (chain or emulsion), a fatty acid, a hydrogen siloxane emulsion, or a combination thereof. Exemplary commercially available water-repellant agents can include, but are not limited to, Baygard® WRS, Baygard® WRC, (Tanatex Chemicals, Netherlands) and Ecorepel® (Schoeller® Textile AG, Switzerland). These long chain hydrocarbons are fluorine free paraffin chains that can wrap around individual fibers in the fabric base substrate. The water-repellant agent can reduce the surface tension of the fabric base substrate such that water and other aqueous solvents form droplets on the surface of the treated fabric base substrate and roll off.

The interaction of the water-repellant agent with the fabric base substrate can vary depending on the substrate and the water-repellant agent. For example, water-repellant agents like paraffin emulsions can be mechanically incorporated in the fibers, lay on the surface of the fibers, or fill in the pores and/or spaces between fibers that compose the fabric base substrate. Water-repellant agents that are fatty acids can react with the fibers in the fabric base substrate to form chemical bonds. Water-repellant agents, like fluorocarbon polymers can physically coat the surface of the fibers that compose the fabric base substrate.

Regardless of the water-repellant agent used, the fabric base substrate of the water-repellant agent can control the surface energy ($\gamma$) of the fabric base substrate. In one example, the treated fabric base substrate can have a surface energy from about 20 millinewton per meter (mN/m) to about 55 mN/m at 25° C. In another example, the treated fabric base substrate can have a surface energy from about 30 mN/m to about 55 mN/m at 25° C. In another example, the treated fabric base substrate can have a surface energy from about 34 mN/m to about 47 mN/m at 25° C. In other examples, the treated fabric base substrate can have a surface energy from about 35 mN/m to about 45 mN/m, from about 40 mN/m to about 45 mN/m, from about 30 mN/m to about 50 mN/m, from about 40 mN/m to about 50 mN/m, or from about 30 mN/m to about 40 mN/m at 25° C. The surface energy (γ) can be measured by a Force Tensiometer (such as K11 by Krüuss, North Carolina).

The amount of water-repellant agent applied to the fabric base substrate can vary. However, in one example, the water-repellant agent can be applied by dipping the fabric base substrate inside the solution of water-repellant agent with a concentration of about 3 grams per liter (g/L) to about 50 g/L. In other examples, the water-repellant agent can be applied at from about 5 g/L to about 45 g/L, from about 5 g/L to about 40 g/L, from about 10 g/L to about 30 g/L, from about 15 g/L to about 35 g/L, from about 3 g/L to about 35 g/L, from about 10 g/L to about 25 g/L, or from about 15 g/L to about 50 g/L. In one specific example, the water repellant agent can be added at greater than 10 g/L to less than 40 g/L.

Adhesion Promotion Layer (130)

The fabric printable medium (100) comprises a fabric base substrate (110) having a water proofing treatment (120); an adhesion promoting layer (130), applied to the image-side (101) of the fabric base substrate, an ink-receiving coating layer (140), applied over said adhesion promoting layer (130). The fabric printable medium further comprises a barrier layer (150), applied to the back-side (102) of the fabric base substrate.

In one example, the adhesion promoting layer (130) can be applied to the treated fabric base substrate at a dry coat-weight ranging from about 0.05 grams per square meter (g/m² or gsm) to about 15 grams per square meter (g/m² or gsm). In other examples, the adhesion promoting layer can be applied at a dry coat-weight ranging from about 0.5 gsm to about 10 gsm or ranging from about 0.1 gsm to about 5 gsm.

The adhesion promoting layer (130) is applied to the treated fabric base substrate and include a polymeric compound and a physical networking component. The first polymeric compound can be any polymer that has good adhesion to the water-repellant agent fabric base substrate. In one example, the polymeric compound can be a water soluble or water dispersible polymer and can include acrylic acid, acrylic emulsion, acrylic-polyurethane, acrylic polymer latex, acrylamide, acrylonitrile, butadiene, acrylonitrile-butadiene, acrylonitrile-butadiene latex, casein, cellulose, carboxy-methyl cellulose, dimethylaminoethyl methacrylate, ethyl acrylate, ethylene, ethylene-vinyl acetate, gelatin, hydroxyethyl acrylate, hydroxyethyl cellulose, hydroxyethyl methacrylate, maleic anhydride, methyl acrylate, methyl methacrylate, methyl vinylether, methyl vinylketone, methacrylamide, polyacrylates, polyacrylic acid, poly(ethylene oxide), polyester, polyester emulsion, polyester resin, polyvinyl acetate, polyvinyl alcohol, cationic polyvinyl alcohol, aceto-acetylated polyvinyl alcohol, silyl-modified polyvinyl alcohol, polyvinyl amine, polyvinyl pyrrolidone, polystyrene, polymethacrylate, polyacrylic ester, polymethacrylic ester, polyurethane, polyurethane resin, polyacrylamide, starch, sodium vinylsulfonate, styrene, styrene-butadiene, styrene-butadiene emulsion, styrene butadiene rubber, soy protein, vinyl acetate, vinyl acetate latex, vinylamide, vinyl caprolactam, vinyl chloride, vinylidene chloride, vinylidene chloride latex, vinylimidazole, vinyl acrylic, vinyl pyrrolidone, vinyl pyridine, vinyl propionate, or a combination thereof.

In another example, the polymeric compound can be a water-soluble polymer, such as polyvinyl alcohol, starch, gelatin, cellulose, or polyacrylamide. In yet another example, the polymeric compound can be a water dispersible polymer such as a polymer selected from acrylic polymers or copolymers, vinyl acetate latex, polyesters, vinylidene chloride latex, styrene-butadiene copolymer, acrylonitrile-butadiene copolymer, or combinations thereof. In yet another example, the polymeric compound can be a styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, or a combination thereof.

In some examples, the polymeric compound can be acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, or a combination thereof. More specifically, the polymer can include a styrene butadiene copolymer.

In further examples, the polymeric compound can be a latex containing particles of vinyl acetate-based polymer, an acrylic polymer, a styrene polymer, a styrene-butadiene rubber polymer, a polyester polymer, a vinyl chloride polymer, or the like. In other examples, the polymer can be a polymer or a copolymer of acrylic polymers, vinyl-acrylic copolymers, acrylic-polyurethane copolymers or a combination thereof. Exemplary polymers can be polyvinyl alcohol, vinylpyrrolidone, a copolymer of vinylpyrrolidone copolymerized with monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, methyl vinylketone, and the like. In yet a further example, the water soluble polymer can include polyvinyl alcohol, copolymers of polyvinyl alcohol and poly(ethylene oxide), copolymers of polyvinyl alcohol and polyvinylamine, cationic polyvinyl alcohols, aceto-acetylated polyvinyl alcohols, polyvinyl acetates, polyvinyl pyrrolidones, copolymers of polyvinyl pyrrolidone and polyvinyl acetate, gelatin, silyl-modified polyvinyl alcohol, styrene-butadiene copolymer, acrylic polymer latex, ethylene-vinyl acetate copolymer, polyurethane resin, polyester resin, or a combination thereof. Exemplary commercially available polymeric compounds can include Poval® 235, Mowiol® 56-88, and Mowiol® 40-88 (all available from Kuraray® Co. Ltd, Japan).

The polymeric compound can have a weight average molecular weight (Mw) of about 5,000 MW to about 200,000 MW. In another example, the weight average molecular weight of the polymeric compound can be from about 10,000 Mw to about 200,000 Mw. In yet another example, the weight average molecular weight of the polymeric compound can be from about 20,000 Mw to about 100,000

Mw. In a further example, the average molecular weight of the polymeric compound can be from about 100,000 Mw to about 200,000 Mw.

In some examples, the polymeric compound can be, but is not limited to, Gencryl® 9525 styrene/butadiene/acrylonitrile copolymer (from RohmNova, Akron Ohio), Gencryl® 9750 styrene/butadiene/acrylonitrile (from RohmNova), STR 5401 styrene/butadiene (from Dow Chemical Company, Midland Mich.), Mowiol® 4-98 polyvinyl alcohol (Kuraray America, Inc., Houston Tex.), Acronal® S728 aqueous dispersion of a styrene/n-butyl acetate polymer (available from BASF), GenFlo® specialty latex products (from Omnova), for example, or a combination of two or more of the above.

The adhesion promoting layer (130) further incorporate a physical networking component. The physical networking component can be a chemical that promotes physical bonding with the polymeric compound to form a gel-like solution. A "gel-like solution" can have a low solids content (from about 0.1 wt % to about 30 wt %) and a high viscosity (>15,000 cps) at low shear stress (6 rpm) when measured by a Brookfield viscometer (Brookfield AMETEK, Massachusetts) at 25° C. A gel-like solution can behave like a non-flowable, semi solid gel, but is able to de-bond at higher shear forces, e.g., 100 rpms or greater, to yield a low viscosity fluid, e.g., less than 5,000 cps. In one example, the adhesion promoting layer can have a solid content from 0.1 wt % to 20 wt % and a viscosity from 5,000 cps to 30,000 cps as measured at 6 rpm. In another example, the adhesion promoting layer can have a solid content from 5 wt % to 30 wt % and a viscosity from 3,000 cps to 15,000 cps as measured at 6 rpm.

In some examples, the adhesion promoting layer can have thixotropic behavior. As used herein, "thixotropic behavior" refers to fluids that are non-Newtonian fluids, i.e. which can show a shear stress-dependent change in viscosity. The term "non-Newtonian" refers herein to fluid having a viscosity that is dependent on an applied force such as shear or thermal forces. For example, shear thinning fluids decrease in viscosity with increasing rate of shear. The stronger the thixotropic characteristic of the chemical fluid of the water barrier layer when it undergoes shear stress, the lower the viscosity of the chemical fluid. When the shear stress is removed or reduced, the viscosity can be re-built up. Without being limited to any theory, it is believed that such thixotropic behavior reduces the penetration of the composition into the fabric base substrate and helps retain the composition at the top surface of the substrate. The fluid becomes thin under shear force when applied by a coating application head (such as a blade coating head). When the fluid is deposited (the nip of the blade and shear force are removed), the viscosity of fluid can be quickly re-built up and the fluid can remain at the top surface of the treated fabric base substrate.

In one example, the physical networking component can be a copolymer of acrylates, such as a copolymer of methacrylic acid and ethyl acrylate ester; a copolymer having with an acrylate based polyelectrolyte backbone and a weight average molecular weight from about 300,000 Mw to about 1,000,000 Mw; a copolymer having a polyester backbone and a weight average molecular weight from about 300,000 Mw to about 1,000,000 Mw; a copolymer having a polyurethane backbone and a weight average molecular weight from about 300,000 Mw to about 1,000,000 Mw; or a combination thereof. In one example, the physical networking component can include an acrylate copolymer, a polyethylene glycol copolymer, a polyurethane copolymer, an isophorone diisocyanate, or a combination thereof and the physical networking component can have a weight average molecular weight from 300,000 Mw to 1,000,000 Mw.

Exemplary commercially available copolymers of acrylates can include, but are not limited to, Acusol™ 810A, Acusol™ 830, Acusol™835, Acusol™842, (Rohm and Haas/The Dow Chemical Co., Pennsylvania), Alcogum® L 11, Alcogum® L 12, Alcogum® L 51, Alcogum® L 31, Alcogum® L 52, (AkzoNobel Co., Chicago) and the like. Exemplary copolymers with acrylate based polyelectrolyte backbone can include acrylic copolymers pendant with hydrophobic groups in addition to acid groups in backbone distributed throughout the polymer chain. Commercially available acrylic copolymer emulsions examples can include Texicryl® 13-317, Texicryl® 13-313, Texicryl® 13-308, and Texicryl® 13-312 (Scott Bader Commonwealth Ltd., United Kingdom).

In one example, the physical networking component can be a copolymer with polyester backbone, having a weight average molecular weight from about 300,000 Mw to about 1,000,000 Mw. Exemplary copolymers can include polyethylene glycol copolymers, grafted pendant with hydrophobic groups and polar groups in the backbone distributed throughout the polymeric chain. A commercially available example includes Rheovis® PE (BASF Corp., North America).

In yet another example, the physical networking component can be a polyurethane copolymer having a polyurethane backbone. Exemplary polymers can include polyethylene glycol and isophorone diisocyanate, which can include end-capping with an alkanol which can also be distributed throughout the polymer chain. Commercially available examples can include Acusol® 880 and Acusol® 882 (Rohm and Haas/The Dow Chemical Co. Pennsylvania).

The Ink-Receiving Layer (140)

The fabric print medium (100) of the present disclosure includes a fabric base substrate (110), with an image-side and a back-side, having a water proofing treatment (120); an adhesion promoting layer (130) and an ink-receiving layer (140). The ink-receiving layer (140), or inkjet receiving layer or image-receiving layer, is applied over an adhesion promoting layer (130) on the image-side of the fabric base substrate (110) having a water proofing treatment 120. The image-receiving layer would act as the image-receiving layer since, during the printing process, the ink will be directly deposited on its surface.

In some examples, the ink-receiving coating (140) can be applied to the fabric base substrate, over the adhesion promoting layer (130), at a dry coat-weight ranging from 3 grams per square meter (g/m2 or gsm) to 30 grams per square meter (g/m2 or gsm). In some other examples, the ink-receiving coating can be applied to the fabric base substrate at a dry coat-weight ranging from 5 gsm to 20 gsm. In yet other examples, the ink-receiving coating can be applied to the fabric base substrate at a dry coat-weight ranging from 5 gsm to 10 gsm.

The ink-receiving layer include a first crosslinked polymeric network and a second crosslinked polymeric network. In some examples, the ink-receiving layer include a first crosslinked polymeric network, a second crosslinked polymeric network and a wax. In some other examples, the ink-receiving layer include a first crosslinked polymeric network, a second crosslinked polymeric network, a wax and a filler.

The first and second crosslinked polymeric networks can include a polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, derivative thereof, or combination thereof. In some examples, the first and second crosslinked polymeric networks can be different polymers.

In one example, the first or second crosslinked polymeric network can include a polyurethane polymer. The polyurethane polymer can be hydrophilic. The polyurethane can be formed in one example by reacting an isocyanate with a polyol. Exemplary isocyanates used to form the polyurethane polymer can include toluene-diisocyanate, 1,6-hexamethylenediisocyanate, diphenyl-methanediisocyanate, 1,3-bis(isocyanatemethyl)cyclohexane, 1,4-cyclohexyldiisocyanate, p-phenylenediisocyanate, 2,2,4(2, 4,4)-trimethylhexamethylenediisocyanate, 4,4'-dicychlohexylmethanediisocyanate, 3,3'-dimethyldiphenyl, 4,4'-diisocyanate, m-xylenediisocyanate, tetramethylxylenediisocyanate, 1,5-naphthalenediisocyanate, dimethyl-triphenyl-methane-tetraisocyanate, triphenyl-methane-triisocyanate, tris(isocyanatephenyl)thiophosphate, and combinations thereof. Commercially available isocyanates can include Rhodocoat® WT 2102 (available from Rhodia AG, Germany), Basonat® LR 8878 (available from BASF Corporation, N. America), Desmodur® DA, and Bayhydur® 3100 (Desmodur and Bayhydur available from Bayer AG, Germany). In some examples, the isocyanate can be protected from water. Exemplary polyols can include 1,4-butanediol; 1,3-propanediol; 1,2-ethanediol; 1,2-propanediol; 1,6-hexanediol; 2-methyl-1,3-propanediol; 2,2-dimethyl-1,3-propanediol neopentyl glycol; cyclohexanedimethanol; 1,2,3-propanetriol; 2-ethyl-2-hydroxymethyl-1, 3-propanediol; and combinations thereof. In some examples, the isocyanate and the polyol can have less than three functional end groups per molecule. In another example, the isocyanate and the polyol can have less than five functional end groups per molecule. In yet another example, the polyurethane can be formed from a polyisocyanate having at least two isocyanate functionalities and a polyol having at least two hydroxyl or amine groups. Exemplary polyisocyanates can include diisocyanate monomers and oligomers.

In one example, the polyurethane prepolymer can be prepared with a NCO/OH ratio from about 1.2 to about 2.2. In another example, the polyurethane prepolymer can be prepared with a NCO/OH ratio from about 1.4 to about 2.0. In yet another example, the polyurethane prepolymer can be prepared using an NCO/OH ratio from about 1.6 to about 1.8.

In one example, the weight average molecular weight of the polyurethane prepolymer can range from about 20,000 Mw to about 200,000 Mw as measured by gel permeation chromatography. In another example, the weight average molecular weight of the polyurethane prepolymer can range from about 40,000 Mw to about 180,000 Mw as measured by gel permeation chromatography. In yet another example, the weight average molecular weight of the polyurethane prepolymer can range from about 60,000 Mw to about 140,000 Mw as measured by gel permeation chromatography.

Exemplary polyurethane polymers can include polyester based polyurethanes, U910, U938 U2101 and U420; polyether-based polyurethane, U205, U410, U500 and U400N; polycarbonate-based polyurethanes, U930, U933, U915 and U911; castor oil based polyurethane, CUR21, CUR69, CUR99 and CUR991; and combinations thereof. (All of these polyurethanes are available from Alberdingk Boley Inc., North Carolina).

In some examples the polyurethane can be aliphatic or aromatic. In one example, the polyurethane can include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, or a combination thereof. In another example, the polyurethane can include an aromatic polyether polyurethane, an aliphatic polyether polyurethane, an aromatic polyester polyurethane, an aliphatic polyester polyurethane, and a combination thereof. Exemplary commercially-available examples of these polyurethanes can include; NeoPac® R-9000, R-9699, and R-9030 (available from Zeneca Resins, Ohio), Printrite® DP376 and Sancure® AU4010 (available from Lubrizol Advanced Materials, Inc., Ohio), and Hybridur® 570 (available from Air Products and Chemicals Inc., Pennsylvania), Sancure® 2710, Avalure® UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure® 878, Sancure® 815, Sancure® 1301, Sancure® 2715, Sancure® 2026, Sancure® 1818, Sancure® 853, Sancure® 830, Sancure® 825, Sancure® 776, Sancure® 850, Sancure® 12140, Sancure® 12619, Sancure® 835, Sancure® 843, Sancure® 898, Sancure® 899, Sancure® 1511, Sancure® 1514, Sancure® 1517, Sancure® 1591, Sancure® 2255, Sancure® 2260, Sancure® 2310, Sancure® 2725, Sancure® 12471, (all commercially available from available from Lubrizol Advanced Materials, Inc., Ohio), and combinations thereof.

In some examples, the polyurethane can be cross-linked using a cross-linking agent. In example, the cross-linking agent can be a blocked polyisocyanate. In another example, the blocked polyisocyanate can be blocked using polyalkylene oxide units. In some examples, the blocking units on the blocked polyisocyanate can be removed by heating the blocked polyisocyanate to a temperature at or above the deblocking temperature of the blocked polyisocyanate in order to yield free isocyanate groups. An exemplary blocked polyisocyanate can include Bayhydur® VP LS 2306 (available from Bayer AG, Germany). In another example, the crosslinking can occur at trimethyloxysilane groups along the polyurethane chain. Hydrolysis can cause the trimethyloxysilane groups to crosslink and form a silesquioxane structure. In another example, the crosslinking can occur at acrylic functional groups along the polyurethane chain. Nucleophilic addition to an acrylate group by an acetoacetoxy functional group can allow for crosslinking on polyurethanes including acrylic functional groups. In other examples the polyurethane polymer can be a self-crosslinked polyurethane. Self-crosslinked polyurethanes can be formed, in one example, by reacting an isocyanate with a polyol.

In another example, the first or second crosslinked polymeric network can include an epoxy. The epoxy can be an alkyl epoxy resin, an alkyl aromatic epoxy resin, an aromatic epoxy resin, epoxy novolac resins, epoxy resin derivatives, and combinations thereof. In some examples, the epoxy can include an epoxy functional resin having one, two, three, or more pendant epoxy moieties. Exemplary epoxy functional resins can include Ancarez® AR555 (commercially available from Air Products and Chemicals Inc., Pennsylvania), Ancarez® AR550, Epi-rez 3510W60, Epi-rez® 3515W6, Epi-rez® 3522W60 (all commercially available from Hexion, Texas) and combinations thereof. In some examples, the epoxy resin can be an aqueous dispersion of an epoxy resin. Exemplary commercially available aqueous dispersions of epoxy resins can include Araldite® PZ3901, Araldite® PZ3921, Araldite® PZ3961-1, Araldite® PZ323 (commercially available from Huntsman International LLC, Texas), Waterpoxy® 1422 (commercially available from BASF, Germany), Ancarez® AR555 1422 (commercially available from Air Products and Chemicals, Inc., Pennsylvania), and combinations thereof. In yet another example, the epoxy resin can include a polyglycidyl or polyoxirane resin.

In one example, the epoxy resin can be self-crosslinked. Self-crosslinked epoxy resins can include polyglycidyl resins, polyoxirane resins, and combinations thereof. Polyglycidyl and polyoxirane resins can be self-crosslinked by a catalytic homopolymerization reaction of the oxirane functional group or by reacting with co-reactants such as polyfunctional amines, acids, acid anhydrides, phenols, alcohols, and/or thiols.

In other examples, the epoxy resin can be crosslinked by an epoxy resin hardener. Epoxy resin hardeners can be included in solid form, in a water emulsion, and/or in a solvent emulsion. The epoxy resins hardener, in one example, can include liquid aliphatic amine hardeners, cycloaliphatic amine hardeners, amine adducts, amine adducts with alcohols, amine adducts with phenols, amine adducts with alcohols and phenols, amine adducts with emulsifiers, ammine adducts with alcohols and emulsifiers, polyamines, polyfunctional polyamines, acids, acid anhydrides, phenols, alcohols, thiols, and combinations thereof. Exemplary commercially available epoxy resin hardeners can include Anquawhite® 100 (commercially available from Air Products and Chemicals Inc., Pennsylvania), Aradur® 3985 (commercially available from Huntsman International LLC, Texas), Epikure® 8290-Y-60 (commercially available from Hexion, Texas), and combinations thereof.

In one example, the first or second crosslinked polymeric network can include an epoxy resin and the epoxy resin can include a water-based epoxy resin and a water-based polyamine. In another example, the first or second crosslinked polymeric network can include a vinyl urethane hybrid polymer, a water-based epoxy resin, and a water-based polyamine epoxy resin hardener. In yet another example, the first or second crosslinked polymeric network can include an acrylic-urethane hybrid polymer, a water-based epoxy resin, and a water-based polyamine epoxy resin hardener.

In a further example, the first or second crosslinked polymeric network can include a styrene maleic anhydride (SMA). In one example, the SMA can include NovaCote 2000® (Georgia-Pacific Chemicals LLC, Georgia). In another example, the styrene maleic anhydride can be combined with an amine terminated polyethylene oxide (PEO), amine terminated polypropylene oxide (PPO), copolymer thereof, or a combination thereof. In one example, combining a styrene maleic anhydride with an amine terminated PEO and/or PPO can strengthen the polymeric network by crosslinking the acid carboxylate functionalities of the SMA to the amine moieties on the amine terminated PEO and/or PPO. The amine terminated PEO and/or PPO, in one example, can include amine moieties at one or both ends of the PEO and/or PPO chain, and/or as branched side chains on the PEO and/or PPO. In one example, utilizing an amine terminated PEO and/or PPO in combination with a SMA can allow for the user to retain the glossy features of the SMA while eliminating the brittle nature of SMA. Exemplary commercially available amine terminated PEO and/or PPO compounds can include Jeffamine® XTJ-500, Jeffamine® XTJ-502, and Jeffamine® XTJ D-2000 (all available from Huntsman International LLC, Texas). In some examples, a weight ratio of SMA to the amine terminated PEO and/or PPO can range from about 100:1 to about 2.5:1. In another, a weight ratio of the SMA to the amine terminated PEO and/or PPO can range from about 90:1 to about 10:1. In yet another example, a weight ratio of the SMA to the amine terminated PEO and/or PPO can range from about 75:1 to about 25:1.

The first and second crosslinked polymeric networks can be present in the ink-receiving coating layer in a variety of amounts. In one example, the first and second crosslinked polymeric networks can collectively range from about 80 wt % to about 99 wt % of the ink-receiving coating layer. In another example, the first and second crosslinked polymeric networks can collectively range from about 85 wt % to about 93 wt % of the ink-receiving coating layer. In some examples the first and second crosslinked polymeric networks can be present in equal amounts. In other examples the first and second crosslinked polymeric networks can be present in different amounts.

The Barrier Layer (150)

The fabric print medium (100) of the present disclosure includes a fabric base substrate 110, with an image-side (101) and a back-side 102, having a water proofing treatment 120; an adhesion promoting layer (130) and an ink-receiving layer (140) on its image-side (101) and having a barrier layer (150) applied to the back-side (102) of the printable medium 110.

The barrier layer (150) can be applied to the fabric base substrate at a dry coat-weight range from about 5 grams per square meter (g/m2 or gsm) to about 60 grams per square meter (g/m2 or gsm). In some examples, the barrier layer can be applied to the fabric base substrate a dry coat-weight ranging from about 10 gsm to about 30 gsm. In some other examples, the coating layer can be applied to the fabric base substrate at a coating weight from about 15 gsm to about 25 gsm. The barrier layer or barrier coating composition or barrier coating layer includes a polymeric binder and filler particles with flame retardancy properties, also called flame-retardant agent. Other functional additives can be added to the barrier coating composition, for specific property control such as, for examples, optical brightener agent, optical brightener agent carrier, dyes for color hue, surfactant for wettability, and processing control agent such as deformer, and PH control base/acid buffer.

The barrier layer composition (150) contains a polymeric binder. Without being linked by any theory, it is believed that the polymeric binder can provide binding function to the fillers to form a continuous layer and adhesion function between coating layers and the fabric base substrate. In other examples, the polymeric binder can provide blocking functions to prevent the printing ink from penetrating into the z-direction of the fabric base substrate so that a high ink volume in kept on the surface of printing media to ensure a vivid image. The polymeric binder can be present, in the barrier layer, in an amount ranging from about 10 wt % to about 95 wt % by total weigh of the barrier layer composition. In one example, the polymeric binder can range from about 45 wt % to about 94 wt % of the barrier layer. In another example, the polymeric binder can range from about 10 wt % to about 80 wt % of the barrier layer.

The polymeric binders that are present in the barrier layer can be identical or different to the polymeric compound listed above and that can be present in the barrier layer.

The polymeric binder can be either water a soluble, a synthetic or a natural substance or an aqueous dispersible substance like polymeric latex. In some other examples, the polymeric binder is polymeric latex. The polymeric binder can be a water-soluble polymer or water dispersible polymeric latex. In some examples, the polymeric binder in the barrier layer (150) is a polymer, or a copolymer, selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. In some examples, the polymeric binder has a glass transition temperature (Tg) that is less than 5° C. Indeed, it is believed that polymeric binder with higher glass transition temperature (Tg) might contribute to a stiff coating and can damage the fabric "hand feeling" of the printing media. In some examples, the polymeric binders have a glass transition temperature (Tg) ranging from −40° C. to 0° C. In some other examples, the polymeric binders have a glass transition temperature (Tg) ranging from −20° C. to −5° C. The way of measuring the glass transition temperature (Tg) parameter is described in, for example, Polymer Handbook, 3rd Edition, authored by J. Brandrup, edited by E. H. Immergut, Wiley-Interscience, 1989.

In some examples, the polymeric binders are crossed-linked binder. "Crossed-linked binder" refers to the fact that multiple polymer substances with reactive function groups can react with each other to form a between-molecular chain structure, a cross linker, a macro-molecular substance or a low molecular weight chemical with more than two function groups that can be used. Binders with "self-crosslink" capability can mean that macro-molecular chains have different reactive function groups that can be used. The cross-linked binders can balance both softness and mechanical strength of the coating layers.

In some examples, the polymeric binder is a self-cross-linking aqueous acrylic dispersion such an Edolan® AB available from Tanatex Chemicals (having a solids content of 45% and Tg of −18° C.).

The barrier layer (130) contains a polymeric binder and filler particles that have a nature of flame retardancy (or flame retardancy properties) or contains fillers and, separately, a flame-retardant agent. The fillers that have a nature of flame retardancy or flame retardancy properties can be considered as flame-retardant agents. As flame-retardant agent, it is meant herein any substance that inhibits or reduces flammability or delays their combustion of the media containing it.

In some examples, the "fillers" can be solid particles in the room temperature having flame retardancy properties. In some other examples, the "fillers" also refers to the solid powder package that include a solid powder in the room temperature which has lower or limited flame retardancy properties in one example or has no capability of flame retardancy properties in another example. In this case, the "filler package" or also called "filler", comprises a solid particle compounds and a flame-retardant agent either in solid or liquid state in room temperature. The examples of fillers are, for example, but not limited to, an organohalogenated compound, a polymeric brominated compound, a metal oxide and phosphorus containing composition, a phosphorus and halogen containing composition, a phosphorus containing composition, a nitrogen containing composition, a halogen, an organophosphate, or a combination thereof.

In one example, the fillers with flame retardancy properties can include a mineral compound. Exemplary mineral compounds can include aluminum hydroxide, magnesium hydroxide, huntite (magnesium calcium carbonate), hydromangesite (hydrated magnesium carbonate), phosphorus, red phosphorus, boehmite (aluminum oxide hydroxide), boron compounds, or combinations thereof. In another example, the flame-retardant in filler package can include either a liquid or a solid flame-retardant such as organohalogenated compound. Exemplary organohalogenated compounds can include organobromines, organochlorines, decabromodiphenyl ether, decabromodiphenyl ethane, and combinations thereof.

In yet another example, either the filler or the flame-retardant can include a polymeric brominated compound. Exemplary polymeric brominated compounds can include brominated polystyrenes, brominated carbonate oligomers, brominated epoxy oligomers, tetrabro-mophthalic anhydride, tetrabromo-bisphenol A, hexabromocyclododecane, chlorendic acid, ethers of chlorendic acid, chlorinated paraffins, and combinations thereof. In yet another example, either the filler or flame-retardant can include a metal and phosphorus containing composition. Example metal and phosphorus containing compositions can include aluminum diethylphosphinate, calcium diethylphosphinate, and combinations thereof. In a further example, either the filler or the flame-retardant can include a phosphorus and a halogen containing composition. Exemplary phosphorus and halogen containing compositions can include tris(2,3-dibromopropyl) phosphate, chlorinated organophosphates, tris(1,3-dichloro-2-propyl) phosphate, tetrekis(2-chloroethyl) dicloro-isopentyldiphosphate, tris (1,3-dichloroisopropyl) phosphate, tris(2-chloroisopropyl) phosphate, and combinations thereof.

In some example, either the filler or the flame-retardant can include a phosphorus containing composition. Exemplary phosphorus containing compositions can include phosphates, phosphonates, phoshpinates, and combinations thereof. In some examples, the phosphorus containing composition can have different oxidations states. In one example, the phosphorus containing composition can be a closed ring structure such as FR102® (available from Shanghai Xusen Non-Halogen Smoke Suppressing Fire Retardants Co. Ltd, China) and Aflammit® (available from Thor, Germany). In another example, the phosphorus containing composition can be a water-soluble phosphorus containing compound. Exemplary water-soluble phosphorus containing compositions can include, a phosphonate ester with one or two, closed 4 to 6 member phosphorus containing ring structures. In one example, the water-soluble phosphorus containing composition can be 5-ethyl-2-methyl-1,3,2-dioxaphosphoranian-5-yl)methyl dimethyl phosphonate P oxide. In another example, the water-soluble phosphorus containing composition can be bis[(-ethyl-2-methyl-1,3,2-dioxaphosphorinan-5-yl)methyl] methyl phosphonate P,P'-dioxide. In another example, either the filler or the flame-retardant can include a nitrogen containing composition. Exemplary nitrogen containing compositions can include melamines, melamine derivatives, melamine, melamine cyanurate, melamine polyphosphate, melem (heptazine derivative), melon (heptazine derivative), and combinations.

In some examples, either the filler or the flame-retardant can be a combination of a phosphorus containing compound, a nitrogen containing compound, and/or a halogen. In one example, the flame-retardant can include a phosphorus and a nitrogen containing composition. Exemplary phosphorus and nitrogen containing compositions can include ammonium polyphosphate (APP), poly 4,4-diaminodiphenyl methane spirocyclic pentaerythritol bisphosphonate (PD-SPB), 1,4-di(diethoxy thiophosphamide benzene (DTPAB), and combinations. In another example, either the filler or the flame-retardant can include an organophosphate. The organophosphate can include aliphatic phosphate; aliphatic phosphonate; aromatic phosphonate; aliphatic organophosphate; aromatic organophosphate; polymeric organophosphate with 2 or 3 oxygen atoms attached to the central phosphorus and combinations.

In some examples, the flame-retardant agents or the filler particles with flame retardancy properties are selected from the group consisting of phosphorus-containing compounds, nitrogen-containing compounds, organophosphate compounds, alumina trihydrate and calcium carbonate. In some other examples, the filler particles with flame retardancy properties are selected from the group consisting of phosphorus-containing compounds, nitrogen-containing compounds, organophosphate compounds, alumina trihydrate and calcium carbonate. In yet some other examples, the flame-retardant agents or the filler particles with flame retardancy properties are selected from the group consisting of phosphorus-containing compounds and nitrogen-containing compounds. The flame-retardant, either in solid state or in liquid state, can also be selected from the group consisting of phosphorus-containing compounds, nitrogen-containing compounds, organophosphate compounds, alumina trihydrate and calcium carbonate.

Examples of commercially available products, with flame retardancy properties and the flame-retardant either in solid state or in liquid state include FR102® (available from Shanghai Xusen Co Ltd) or Aflammit® PE and Aflammit® MSG (both available from Thor), Exolit® AP compounds (available from Clariant), solid Aflammit® powder compounds (available from Thor), Disflamoll® DPK (available from Lanxess), Phoslite B compounds (available from Italmatch Chemicals), or SpaceRite® S-3 (J.M. Huber Corp).

In some examples, the filler or filler package or filler particles with flame retardancy properties or flame-retardant agent is present, in the barrier layer (150), in an amount representing from about 10 to about 90 wt % by total weigh of the barrier layer. In some other examples, the filler or filler package or flame-retardant agent is present, in the barrier layer (130), in an amount representing from about 5 wt % to about 90 wt %, or from about 10 wt % to about 80 wt %, or from about 15 wt % to about 70 wt %, by total weigh of the barrier layer.

The filler or the filler package can include a mineral powder, an organo-halogenated compound, a polymeric brominated compound, a metal and phosphorus containing composition, a phosphorus containing composition, a nitrogen containing composition, a halogen, an organophosphate, or combination thereof.

Pressure Sensitive Adhesive Layer (160)

In some examples, a fabric printable medium 100 can further encompass a pressure sensitive adhesive layer 160. When present said "pressure sensitive" adhesive layer (160) is applied over the barrier layer (150) on the back-side (102) of the printable media (100). The pressure sensitive adhesive layer is a thin layer of adhesive applied on the back-side of the fabric (opposite to the image-side that contain the image receiving layer). When present, the pressure sensitive adhesive layer bonds the fabric to a support structure such as a wall or other media support surface. The pressure sensitive adhesive layer may also allow the wallcovering fabric to be repositioned.

The pressure sensitive adhesive layer may include a polyacrylate based polymer or copolymer that is applied as a solvent dispersion or an aqueous dispersion. The pressure sensitive adhesive layer may be applied using a variety of suitable on-line or off-line coating techniques. In one example, the coat-weight of the pressure sensitive layer is ranging from about 5 to about 60 grams per square meter (g/m2 or gsm). In another example, the coat-weight of the pressure sensitive layer is ranging from about 20 to about 40 grams per square meter (g/m2 or gsm).

In some examples, the pressure sensitive adhesive layer comprises a polyacrylate polymer or a copolymer thereof. The acrylate polymers can include, for example, n-butyl acrylate, ethyl acrylate, 2-ethylhexyl acrylate polymers, copolymers of these acrylates with other comonomers unites, such as methyl methacrylates, t-butyl methacrylate, methyl acrylate, acrylic acid, styrene, natural rubber, synthetic thermoplastic elastomer, silicone rubber, rosins, terpenes, modified terpenes, aliphatic resins, cycloaliphatic resins, aromatic resins, hydrogenated hydrocarbon resins, terpene-phenol resins, derivatives, or combinations thereof.

Release Layer (170)

In some examples, a fabric printable medium (100) can further encompass a release layer 170. When present, said release layer (170) is applied over the pressure sensitive adhesive layer (160) on the back-side (102) of the printable media (100). The function of this release layer (170) can be seen as allowing a backing sheet to be easily removed from the pressure sensitive adhesive coating layer (160). According to one example, the release layer may be formed from poly-silicone. The release layer may be applied in solvent or aqueous dispersion by an on-line or off-line coater. According to one example, the backing sheet may be a wax coated paper to protect the pressure sensitive adhesive layer from being contaminated prior to usage. A variety of other backing sheet configurations can also be used.

Method for Forming a Fabric Print Medium

The fabric print medium is prepared by using a surface treatment composition herein named a coating layer or coating composition. The fabric printable medium is prepared by using several surface treatment compositions herein named a coating layer or coating composition. In some examples, as illustrated in FIG. 3, the method (200) for forming the fabric printable medium encompasses: providing (210) a fabric base substrate with an image-side and a back-side (i.e. with a first and a second side) a water proofing treatment including a water-repellant agent applied thereto; applying (220) an adhesion promoting layer, on the image-side on the fabric base substrate, the adhesion promoting layer comprising a polymeric compound and a physical networking component; applying (230) an ink-receiving coating layer, on the image-side, over the adhesion promoting layer, comprising a first and a second crosslinked polymeric network; and applying (240) a barrier layer on the back-side of the medium, comprising polymeric binders and filler particles with flame retardancy properties.

In some examples, the method for forming the fabric printable medium encompasses the application of a pressure sensitive adhesive coating layer on top of the barrier coating layer. In some other examples, the method for forming the fabric printable medium encompasses the application of a release layer on top of the pressure sensitive adhesive coating layer.

In some examples, the water proofing treatment containing the water-repellent agent is applied to the fabric base substrate (110) using padding procedures (i.e. by a padding machine). The water proofing treatment including a water-repellant agent can be applied to the fabric base substrate via a dip coater The fabric base substrate can go, first, through a coat pan with the water proofing treatment containing the water-repellent agent, then the soaked fabric can go through a two-roll nip to squeeze the extra water out. The dryness after nip can be of around 40%.

In some examples, the fabric base substrate is soaked in a bath containing the water proofing treatment containing the water-repellent agent and the excess of water can be rolled out. More specifically, fabric substrates impregnated with water proofing treatment (prepared by bath, spraying, dipping, etc.) can be passed through padding nip rolls under pressure. The impregnated fabric, after nip rolling, can then be dried under heat at any functional time which is controlled by machine speed with peak fabric web temperature in the range of about 90° C. to about 180° C. In some examples, pressure can be applied to the fabric substrate after impregnating the fabric base substrate with the water proofing treatment containing the water-repellent agent. In some other examples, the surface treatment is accomplished in a pressure padding operation. During such operation, the fabric base substrate is firstly dipped into a pan containing treatment coating composition and is then passed through the gap of padding rolls. The padding rolls (a pair of two soft rubber rolls or a metal chromic metal hard roll and a tough-rubber synthetic soft roll for instance), apply the pressure to composite-wetted textile material so that the water-repellent agent amount can be accurately controlled. In some examples, the pressure, that is applied, is between about 10 and about 150 PSI or, in some other examples, is between about 30 to about 70 PSI.

The fabric base substrate that has been treated with a water proofing treatment to form a treated fabric base substrate (120) can be dried using box hot air dryer. The dryer can be a single unit or could be in a serial of 3 to 7 units so that a temperature profile can be created with initial higher temperature (to remove excessive water) and mild temperature in end units (to ensure completely drying with a final moisture level of less than 1-5% for example). The peak dryer temperature can be programmed into a profile with higher temperature at beginning of the drying when wet moisture is high and reduced to lower temperature when web becoming dry. The dryer temperature is controlled to a temperature of less than about 200° C. to avoid yellowing textile, and the fabric web temperature is controlled in the range of about 90 to about 180° C. In some examples, the operation speed of the padding/drying line is 50 yards per minute.

The application of the adhesion promoting layer, the ink-receiving coating layer and of the barrier layer can include a floating knife process, a knife on roll mechanism process, or a transfer coating process. The floating knife process can include stretching the fabric to form an even uniform surface. The floating knife process can further include transporting the fabric under a stationary knife blade. In some examples, the step of applying the barrier layer can include applying a foam coating. The foam coating can be applied using a knife-on-the roll mechanism. The knife-on-the roll mechanism can be followed by passing the fabric through calendaring pressure nips. The calendaring can be done either in room temperature or at an elevated temperature and/or pressure. The elevated temperature can range from 40° C. to 100° C. The elevated pressure can range from about 100 psi to about 5,000 psi. In some other examples, the coating process can include transferring the coating composition. When the coating composition is transferred, the coating can be spread onto a release substrate to form a film. The film can then be laminated onto the fabric.

Coating compositions can be dried using hot air dryer unit. The dryer can be a single unit or could be in a serial of 3 to 8 units so that a temperature profile can be created with initial lower temperature (to remove excessive water) and mild temperature in end units (to ensure completely drying with a final moisture level of less than 1-5% for example). The peak dryer temperature can be programmed into a profile with lower to moderate temperature at beginning of the drying when wet moisture is high and then go through peak temperature range to ensure the coating is dried and cross-linked if required. At the end of profile, the web temperature is reduced to lower temperature when web becoming dry. The dryer temperature is controlled to a temperature of less than about 200° C. peak temperature to avoid yelling textile, and the fabric web temperature is controlled in the range of about 90 to about 180° C. In some examples, the operation speed of the coating/drying line is 20 meters per minute for barrier and top image receiving coatings and 30-50 meters per minute for barrier layer.

In some examples, the method can further include applying pressure using pressure nips equipped on the coater meaning calendaring the web with the same speed as coating, or off-line calendar, under single or multiple calendaring nips to the fabric media after applying the barrier and top coating layer, or only after applying the top coating layer, with the same or different calendaring speed.

In some examples, the barrier layer coating composition is mixed and prepared, and can be foamed by injected with air prior to the application to the fabric base substrate in order to generate air bubbles therein and to provide air voids within the barrier coating layer. On another example, the barrier layer composition can be mixed and defoamed before applying it onto the fabric surface to form a coating matrix with a polymeric binder, filler particles, and/or a filler package.

Printing Method

Once the coating compositions are applied to the fabric base substrate and appropriately dried, ink compositions can be applied by any processes onto the fabric printable medium. In some examples, the ink composition is applied to the fabric printable medium via inkjet printing techniques.

As illustrated in FIG. 4, the printing method (300) encompasses obtaining (310) a fabric printable medium, with an image-side and a back-side, comprising a fabric base substrate having a water proofing treatment including a water-repellant agent applied thereto; an adhesion promoting layer, applied to the image-side on the fabric base substrate, the adhesion promoting layer comprising a polymeric compound and a physical networking component; an ink-receiving coating layer, applied on the image-side, over the adhesion promoting layer, comprising a first and a second crosslinked polymeric network; and a barrier layer applied to the back-side of the medium, comprising polymeric binders and filler particles with flame retardancy properties; and, then, applying (320) an ink composition onto said fabric printable medium to form a printed image. Said printed image will have, for instance, enhanced image quality and image permanence. In some examples, when needed, the printed image can be dried using any drying device attached to a printer such as, for instance, an IR heater.

In some examples, the ink composition is an inkjet ink composition that contains one or more colorants that impart the desired color to the printed message and a liquid vehicle. As used herein, "colorant" includes dyes, pigments, and/or other particulates that may be suspended or dissolved in an ink vehicle. The colorant can be present in the ink composition in an amount required to produce the desired contrast and readability. In some examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

In some other examples, the ink composition, applied to the fabric print medium, is an ink composition containing latex components. Latex components are, for examples, polymeric latex particulates. The ink composition may contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, nonionic, or amphoteric polymeric latex. Monomers that are often used to make synthetic latexes include ethyl acrylate; ethyl methacrylate; benzyl acrylate; benzyl methacrylate; propyl acrylate; methyl methacrylate, propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycoldicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxy-propyhiethyl-dimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate.

In some examples, the latexes are prepared by latex emulsion polymerization and have an average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, polystyrene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

EXAMPLES

The raw materials and chemical components used in the illustrating samples are listed in Table 1.

TABLE 1

| Ingredients | Nature of the ingredients | Supplier |
| --- | --- | --- |
| Phobloc ® CP-C | fluorochemical Water Repellant Agent | Huntsman Advanced Materials |
| Z31-3 | Water Repellant Agent | Venus chemical Co. |
| GenFlo ® 3000 | carboxylated styrene-butadiene copolymer | Omnova Solutions |
| Sterocoll ® FS. | anionic dispersion of ethyl acrylate-carboxylic acid copolymer-Physical Networking Component | BASF Corp |
| Byk-Dynwet ® 800 | silicone-free wetting agent | BYK Inc. |
| Araldite ® PZ 3901 | Cross-linked polymeric network | Hundtsman Inc. |
| Aradur ® 3985 | Cross-linked polymeric network | Hundtsman Inc. |
| Sancure ® 2026 | Polyurethane polymer | Lubrizol Inc. |
| Sancure ® AU4010 | Self-Crosslinking aliphatic polyurethane-acrylic network | Lubrizol Inc. |
| Edolan ® AB | Polymeric binder | Tanatex Chemicals |
| SpaceRite ® S3 | Aluminum tri-hydroxide (filler & flame-retardant agent) | J. M. Huber Corp. |
| Tegowet ® 510 | Surfactant | Evonik Industries |
| Foamaster ® MO2185 | De-former | BASF Co. |

Example 1

Preparation of Printable Medium Samples

The illustrating samples are fabric print medium in accordance with the principles described herein. Each sample has a support base structure (110) which is a 100% woven polyester fabric having a weight of 112 gsm and thickness of 175 micrometers (μm). The fabric base substrates are treated as indicated in the table 2 below (i.e. coated with a water-proofing treatment) before the application of the coatings layers. An adhesion promoting layer (130); an ink-receiving coating layer (140) and a barrier layer (150) are then applied to the treated fabric substrate.

The treatment process of the fabric base substrate involves dipping the media in the water-proofing treatment for about 30 to 120 seconds, removing the media from the water-proofing treatment, and rolling the treated fabric base substrate between a pair of rollers having a pressure of 50 psi. The treated fabric base substrate is allowed to dry at 150° C. for 5 min. The water repellant agent is present in the water proofing treatment composition at from 10 g/L to 40 g/L, as set forth in Table 1. When the treated fabric base substrate is dry, an adhesion promoting layer is applied to one side of the fabric at a weight of 3 to 7 gsm.

The composition of the adhesion promoting layer is also shown in Table 2. The adhesion promoting layer is applied using a 2.4 m width flat tip blade production knife on a knife coater. During processing, the adhesion promoting layer is applied directly to the treated fabric base substrate across the entire width of the web in front of a fixed knife. As the web was transporting under the knife, the forward motion of the fabric and fixed knife barrier applied the coating material in a rotatory motion. This rolling bank of coating component serves as a coating reservoir. After the knife, the coating web is dried through a drying oven using hot air. The thickness of the coatings, or coat-weight, is controlled by the coating slides, web tension and type of knife. The coating speed is in the range of 30 to 40 m/min.

TABLE 2

| Fabric Print Medium | Water Repellant Agent of Water Proofing Treatment | | Adhesion Promoting Layer (130) | |
|---|---|---|---|---|
| | Phobloc® CP-C | Z31-3 | GenFlo® 3000 | Sterocoll® FS |
| A | 20 g/L | — | 7 gsm | 0.01 wt % of polymer |
| B | — | 30 g/L | 7 gsm | 0.01 wt % of polymer |
| C | — | 20 g/L | 7 gsm | 0.01 wt % of polymer |

Following application of the adhesion promoting layer, an ink-receiving layer and a barrier layer are applied. The different formulations of the adhesion ink-receiving layer (140) and of the barrier layer (140) are illustrated in the tables 3 and 4. The ink-receiving layer is applied at 20 gsm using a 3 mm U-type knife at a speed of 20 m/min, and knife depth of 1 cm. The barrier layer is applied at 6 gsm using a flat type knife at a speed of 20 m/min and a knife depth of 15 mm.

The thickness of the coatings, or coat-weight, is controlled by the gap between the bottom of the knife and the top of the fabric. A 2 mm flat tip blade (knife) is use for the ink-receiving coating, while the barrier coating is accomplished by use a 3 mm U-type blade. The depth of blade is 1 cm. The coating speed is in the range of 20 to 30 m/min. After the coating compositions are applied on the fabric web, the web is gone through a 40 m long hot air dryer with multiple controlled units so that a drying temperature profile can be set (For example, one of the setting coating is 110° C., 120° C., 130° C., 130° C., 130° C., 130° C., 115° C. and 90° C.). An on-line pressure nip is also closed to the coatings to further smooth-out the surface.

Each media further includes a Pressure Sensitive Adhesive layer, made of a polyacrylate based polymer, applied at a coat weight of about 20 gsm.

TABLE 3

Ink-receiving Layer (140)

| Ingredient | Amount (dry weight by parts) | Weight Percentage |
|---|---|---|
| BYK® -Dynwet 800 | 1 | 4.59 |
| BYK® 024 | 0.5 | 2.29 |
| Araldite® PZ 3901 | 10 | 45.87 |
| Aradur® 3985 | 1 | 4.59 |
| Sancure® 2016 | 5.8 | 26.60 |
| Sancure® 4010 | 3.5 | 16.06 |

TABLE 4

Barrier Layer (150)

| Ingredient | Amount (dry weight) | Weight Percentage |
|---|---|---|
| Edolan® AB | 40 | 28.3 |
| SpaceRite® S3 | 100 | 70.7 |
| Tegowet® 510 | 1 | 0.7 |
| Foamaster® MO 2185 | 0.5 | 0.3 |

Example 2

Samples Performances

The same images are printed using a HP® DesignJet L360 Printer equipped with HP 789 ink cartridge (HP Inc.). The printer is set with a heating zone temperature at about 50° C., a cure zone temperature at about 110° C., and an air flow at about 15%. The printed fabric mediums are evaluated for different performances: image durability and Backside Peel Adhesion Strength. The fabric print medium according to the present disclosure provides several advantages in terms of image quality, and image durability performances.

The image-side durability test is performed by exposing the various samples to be tested to a 45-degree coin scratching under a normal force of 800 g (Abrasion test). The test is done using a Taber 5750 Linear Abraser (Taber Industries, Tonawada, N.Y.) with a linear, back-and-forth action, attempting to scratch off the image-side of the samples (5 cycles). Image-side durability test is also performed in accordance with ASTM F793/F793M-15 scrubbability test for 300 cycles. A BYK Abrasion Tester (from BYK-Gardner USA, Columbus, Md.) and ASTM F793 detergent are used (Scrub Test). The results of these tests are expressed in Table 5 below.

The backside peel adhesion strength is tested using a T-peel configuration similar to ASTM D3330/D3330M and ASTM F2226-03. This is performed by separating one end of the sample and gripping each end onto an Instron (Instron, Norwood, Mass.). A peeling geometry of 180 degrees and a speed of 300 mm/min is used. The average force resistance (expressed in Newton in reported in the Table 5.

TABLE 5

| | Image-side-Durability Testing | | Back-side Peel Adhesion Strength | |
|---|---|---|---|---|
| | ASTM F793 Scrub Test | Taber 5750 Abrasion test | MD Average Force, N | CD Average Force, N |
| MEDIA A | Pass | Pass | 32.2 | 44.2 |
| MEDIA B | Pass | Pass | 41.2 | 39.5 |
| MEDIA C | Pass | Pass | 38.1 | 32.5 |

The invention claimed is:
1. A fabric printable medium comprising:
a fabric base substrate, with an image-side and a backside, having a water proofing treatment including a water-repellant agent applied thereto;
an adhesion promoting layer, applied to the image-side of the fabric base substrate, comprising a polymeric compound and a physical networking component;
an ink-receiving coating layer, applied over the adhesion promoting layer, comprising a first and a second cross-linked polymeric network;

a barrier layer, applied to the back-side of the fabric base substrate, comprising polymeric binders and filler particles with flame retardancy properties; and a pressure sensitive adhesive coating layer that is applied on top of the barrier layer, wherein a coat weight of the pressure sensitive adhesive coating layer ranges from about 5 gsm to about 60 gsm.

2. The fabric printable medium of claim 1 wherein the water-repellent agent comprises a fluorocarbon polymer, polyacrylate with perfluoro side chain, a polyvinylidene chloride emulsion, a polyolefin emulsion, a poly(ethyl-terephthalate) emulsion, an aqueous wax dispersion, a perfluorooctane sulfonate, a perfluorooctanoic acid, a paraffin wax, paraffin wax plus aluminum salt, paraffin wax plus chromium salt, a fatty acid, a hydrogen siloxane emulsion, or a combination thereof.

3. The fabric printable medium of claim 1 wherein the water-repellent agent is a fluorocarbon polymer.

4. The fabric printable medium of claim 1 wherein, in the adhesion promoting layer, the physical networking component comprises an acrylate copolymer, a polyethylene glycol copolymer, a polyurethane copolymer, an isophorone diisocyanate, or a combination thereof; and wherein the physical networking component has a weight average molecular weight from 300,000 Mw to 1,000,000 Mw.

5. The fabric printable medium of claim 1 wherein, in the adhesion promoting layer, the polymeric compound is an acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, or a combination thereof.

6. The fabric printable medium of claim 1 wherein the adhesion promoting layer is applied at a dry coat weight ranging from about 7 gsm to about 15 gsm coat weight.

7. The fabric printable medium of claim 1 wherein, in the ink-receiving coating layer, the first crosslinked polymeric network and the second crosslinked polymeric network are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

8. The fabric printable medium of claim 1 wherein the ink-receiving coating layer has a coat-weight ranging from about 3 gsm to about 30 gsm.

9. The fabric printable medium of claim 1 wherein, in the barrier layer, the polymeric binder is a polymer, or a copolymer, selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers.

10. The fabric printable medium of claim 1 wherein, in the barrier layer, the filler particles with flame retardancy properties is selected from the group consisting of phosphorus-containing compounds, nitrogen-containing compounds, organophosphate compounds, alumina trihydrate and calcium carbonate.

11. The fabric printable medium of claim 1 wherein the barrier layer is applied to the fabric base substrate at a dry coat-weight range from about 5 gsm to about 60 gsm.

12. The fabric printable medium of claim 1 further comprising a release layer that is applied on top of the pressure sensitive adhesive coating layer.

13. The fabric printable medium of claim 1 wherein the coat weight of the pressure sensitive adhesive coating layer ranges from about 20 gsm to about 40 gsm.

14. The fabric printable medium of claim 1 wherein, in the barrier layer, the filler particles with flame retardancy properties is selected from the group consisting of phosphorus-containing compounds, nitrogen-containing compounds, and organophosphate compounds.

15. A method for forming a fabric printable medium comprising:

providing a fabric base substrate, with an image-side and a back-side, having a water proofing treatment including a water-repellant agent applied thereto;

applying an adhesion promoting layer, on the image-side of the fabric base substrate, the adhesion promoting layer comprising a polymeric compound and a physical networking component;

applying an ink-receiving coating layer, on the image-side of the fabric base substrate, over the adhesion promoting layer, comprising a first and a second crosslinked polymeric network; and applying a barrier layer on the back-side of the fabric base substrate, comprising polymeric binders and filler particles with flame retardancy properties; and a pressure sensitive adhesive coating layer that is applied on top of the barrier layer, wherein a coat weight of the pressure sensitive adhesive coating layer ranges from about 5 gsm to about 60 gsm.

16. A printing method comprising:

obtaining a fabric printable medium comprising a fabric base substrate, with an image-side and a back-side, having a water proofing treatment including a water-repellant agent applied thereto; an adhesion promoting layer, applied to the image-side on the fabric base substrate, the adhesion promoting layer comprising a polymeric compound and a physical networking component; an ink-receiving coating layer, applied on the image-side, over the adhesion promoting layer, comprising a first and a second crosslinked polymeric network; a barrier layer applied to the back-side of the medium, comprising polymeric binders and filler particles with flame retardancy properties; and a pressure sensitive adhesive coating layer that is applied on top of the barrier layer, wherein a coat weight of the pressure sensitive adhesive coating layer ranges from about 5 gsm to about 60 gsm;

and applying an ink composition onto said fabric printable medium to form a printed image.

17. A fabric printable medium consisting of:

a fabric base substrate, with an image-side and a back-side, having a water proofing treatment including a water-repellant agent applied thereto;

an adhesion promoting layer, applied to the image-side of the fabric base substrate, comprising a polymeric compound and a physical networking component;

an ink-receiving coating layer, applied over the adhesion promoting layer, comprising a first and a second crosslinked polymeric network;

a barrier layer, applied to the back-side of the fabric base substrate, comprising polymeric binders and filler particles with flame retardancy properties; and a pressure sensitive adhesive coating layer that is applied on top of the barrier layer;

and optionally, a release layer that is applied on top of the pressure sensitive adhesive coating layer.

\* \* \* \* \*